United States Patent [19]

Leff

[11] Patent Number: 4,679,695

[45] Date of Patent: Jul. 14, 1987

[54] CONTAINER RACK

[76] Inventor: Thomas E. Leff, 10302 Viacha Dr., San Diego, Calif. 92124

[21] Appl. No.: 650,729

[22] Filed: Sep. 17, 1984

[51] Int. Cl.⁴ .............................................. A47G 29/00
[52] U.S. Cl. ........................................ 211/71; 211/74
[58] Field of Search .......................... 211/71, 74, 60.1; 47/83, 39, 41.11; D6/403, 405, 469; 248/312.1, 315

[56] References Cited

U.S. PATENT DOCUMENTS

| | | |
|---|---|---|
| 1,014,115 | 1/1912 | Bounds . |
| 1,073,138 | 9/1913 | Jones . |
| 1,102,037 | 6/1914 | Gibson . |
| 1,103,689 | 7/1914 | Russell . |
| 1,112,558 | 10/1914 | Red . |
| 1,475,483 | 11/1923 | Galuska . |
| 1,523,875 | 1/1925 | Iseman et al. . |
| 1,601,040 | 9/1926 | Phillips et al. . |
| 1,697,235 | 1/1929 | Franke . |
| 1,823,396 | 9/1931 | Goulet . |
| 1,877,217 | 9/1932 | Anderson .......................... 211/74 X |
| 1,975,651 | 10/1934 | Wolfe .................................... 211/71 |
| 2,261,122 | 11/1941 | Martinus ............................... 211/71 |
| 2,868,385 | 1/1959 | Dreyfus, Jr. ........................... 211/71 |
| 2,926,022 | 2/1960 | Nau et al. ............................. 280/79.3 |
| 3,190,454 | 6/1965 | Brooks .................................. 211/71 |
| 3,710,997 | 1/1973 | Asikainen ......................... 248/315 X |
| 3,926,314 | 12/1975 | Dogliotti .............................. 211/71 |
| 4,187,948 | 2/1980 | Perrella ................................ 211/71 |

FOREIGN PATENT DOCUMENTS

| | | | |
|---|---|---|---|
| 810911 | 3/1959 | United Kingdom .................. 211/71 |
| 1450044 | 9/1976 | United Kingdom .................. 211/71 |

Primary Examiner—Robert W. Gibson, Jr.
Assistant Examiner—Blair M. Johnson
Attorney, Agent, or Firm—Baker, Maxham & Jester

[57] ABSTRACT

A plurality of vertical support members are mounted in spaced apart alignment on a horizontal rectangular base. A plurality of hoops are mounted between adjacent vertical support members for each removably receiving an upwardly opening cylindrical container having an annular lip. The hoops are positioned and oriented to arrange the containers in vertically spaced rows extending horizontally relative to the length of the base. Vertically adjacent rows are horizontally staggered relative to the width of the base, and the containers of each row are inclined from their normal free-standing positions away from the containers in an adjacent horizontally staggered row.

8 Claims, 3 Drawing Figures

CONTAINER RACK

BACKGROUND OF THE INVENTION

The present invention relates to storage racks and the like, and more particularly, to a multi-tiered rack for holding a plurality of cylindrical food storage containers at a convenient angle for dispensing.

In the restaurant business, certain condiments, salad dressings and other food preparations are purchased in three to five gallon cylindrical containers having replaceable lids. These containers must be refrigerated when not in use to prevent spoilage of the food preparations. It is time consuming and laborous to repeatedly remove and replace such containers from refrigerators. Also, when a number of containers are removed from a refrigerator and opened, they occupy a considerable amount of counter space and the food preparations are sometimes not readily dispensed therefrom since the containers normally have a vertical free standing position.

SUMMARY OF THE INVENTION

Accordingly, it is the primary object of the present invention to provide an improved container rack.

Another object of the present invention is to provide a container rack which can hold a plurality of cylindrical containers.

Another object of the present invention is to provide a container rack which can hold a plurality of cylindrical containers in horizontal rows, the containers being inclined to facilitate the dispensing of the contents of the containers.

Another object of the present invention is to provide a container rack having a plurality of hoops for removably holding a plurality of open ended cylindrical containers having annular lips.

Another object of the present invention is to provide a container rack for holding a plurality of cylindrical containers in horizontally extending tiers of rows, vertically adjacent rows being staggered, and the containers of adjacent rows being inclined to make them accessible from opposite sides of the rack.

Still another object of the present invention is to provide an improved container rack which can be readily rolled into and out of a refrigeration compartment.

The illustrated embodiment of my container rack has a horizontal base or frame mounted on casters. A plurality of inverted U-shaped vertically extending support members are mounted to the frame in parallel, spaced apart alignment. A plurality of hoops are attached between the legs of adjacent U-shaped vertical support members. Each hoop removably receives a cylindrical upwardly opening container and an annular lip adjacent the mouth of the container prevents it from falling through the hoop. The hoops are positioned on the vertical support members so that when containers are mounted in the same, the containers are arranged in staggered tiers of horizontally extending rows. The hoops on opposite sides of the rack are inclined so that the containers are more readily accessible from opposite sides of the storage rack. The containers in each row overlie the containers in a vertically adjacent row so as to minimize the width of the storage rack.

DESCRIPTION OF THE PREFERRED EMBODIMENT

Figures 1, 2, 3:
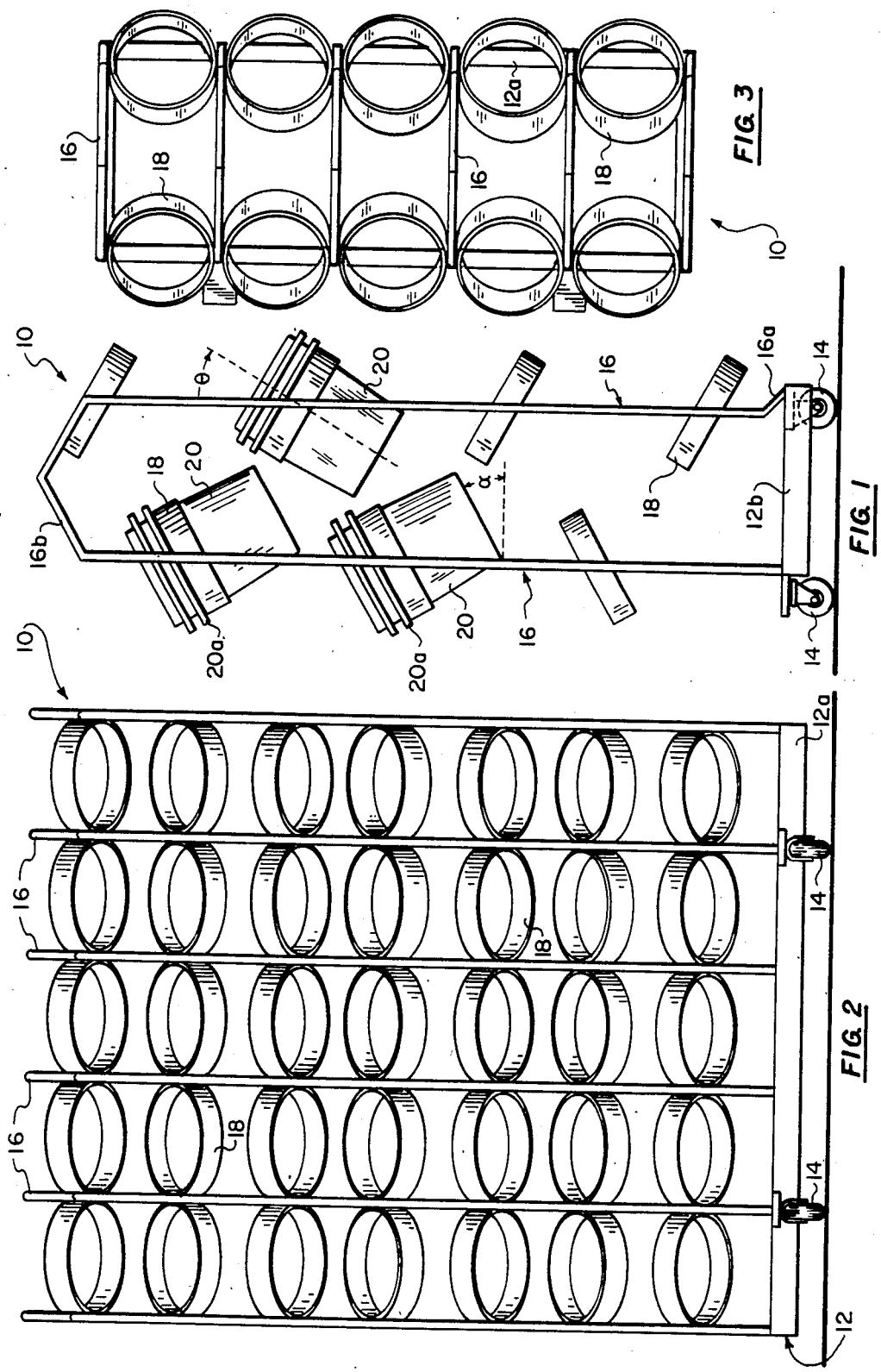
FIG. 1 is an end elevation view of the preferred embodiment of my container rack. Only the endmost vertical support member and container hoops are illustrated in this view for clarity.
FIG. 2 is a front elevation view of the preferred embodiment of my container rack.
FIG. 3 is a top plan view of the preferred embodiment of my container rack. Only the uppermost rows of container hoops are illustrated for clarity.

Referring collectively to FIGS. 1-3, the preferred embodiment 10 of my container rack includes a horizontal base or frame 12 having two parallel side pieces 12a connected by two parallel end pieces 12b. The side and end pieces are preferably stainless steel box beams welded together at their ends. Wheel means in the form of lockable casters 14 are mounted to the frame 12 to provide mobility. Two of the casters are mounted to the outside edge of one of the side pieces 12a of the frame while the other two are mounted to the inside edge of the other side piece. The side with the inboard casters can then be positioned more closely adjacent the wall without damaging the same.

A plurality of U-shaped support members 16 are mounted to the frame 12 in parallel, spaced apart alignment. The terminal ends of the legs of each of the support members are welded to corresponding side pieces 12a of the frame. The lower portion 16a of one of the legs of each support member is angled outwardly for positioning the containers hereafter described over the frame. The uppermost intermediate segment 16b of each of the support members consists of two segments joined at an angle. The vertical support members are preferably made of stainless steel rod, the ends of which are welded or otherwise fastened to the frame.

A plurality of hoops 18 are attached between the legs of adjacent U-shaped vertical support members. Each hoop is preferably made of stainless steel and has an inside diameter of approximately ten and three-quarters inches. The hoops are attached to the vertical support members at diametrically opposite locations, i.e. such that a line joining the attachment points defines a diameter of the hoop, instead of a chord.

Each hoop 18 removably receives a cylindrical, upwardly opening container 20. An annular lip 20a adjacent the mouth of each container prevents it from falling through the hoop. The lip 20a is positioned approximately two-thirds up the height of the container 20 so that the container is stable once inserted into the hoop. The hoops 18 are preferably dimensioned to receive standard containers of approximately three to five gallons in capacity such as those in which food preparations are shipped. One such container is disclosed in U.S. Pat. No. 3,474,928 and is commercially available from Container Supply Company, 12571 Western Avenue, P. O. Box 5367, Garden Grove, Calif., 92645.

The hoops 20 are positioned on the vertical support members so that when the containers 20 are mounted in the same, the containers are arranged in staggered tiers of horizontally extending rows. The hoops on opposite sides of the rack are inclined so that the containers are more readily accessible from opposite sides of the storage rack. The containers in each row overlie the containers in a vertically adjacent row so as to minimize the width of the storage rack.

The angle of inclination of the hoops, and thus of the containers mounted therein, is preferably between about thirty and forty-five degrees. More preferably, the angle is thirty degrees. Specifically, referring to FIG. 1, the angle theta between the vertical axis of the container and the vertical support member 16 is preferably thirty degrees. Stated another way, the angle alpha between the base of a container 20 mounted in a hoop 18 and the horizontal is thirty degrees. It will be understood that oppositely inclining the containers in this manner allows the vertical rows to be interleaved so as to reduce the space that the rack would otherwise occupy. As illustrated in the end view of FIG. 1, the angulation of the alternating rows results in relatively little wasted space between the containers. In actual use, the rack mounted containers are stored in a walk-in refrigerator. When the food preparations stored in the containers are required, the rack is removed from the refrigerator. The lids of the individual containers are then removed so that the food preparations can be quickly and easily dispensed from the containers.

An advantage over prior art systems is that the containers in which the food preparations are commercially delivered are themselves used for dispensing, avoiding the transfer of the food preparations to separate containers. A further advantage of the arrangement is that by intermeshing the containers accessed from opposite sides of the rack, a relatively compact and narrow storage rack is achieved, which allows the rack to be easily wheeled in and out of confined spaces and refrigerators. The stainless steel construction of the rack permits considerable weight to be supported, such as that represented by thirty-five, five gallon containers filled with liquid material, for example, salad dressings.

Having described a preferred embodiment of my invention, it will be apparent that modifications and adaptations thereof will occur to those skilled in the art. For example, the hoops 18 could be pivotally mounted to the vertical support members. The hoops need not be circular, but could be rectangular in configuration for supporting square, lipped containers. Furthermore, the vertical support members could be made of posts, having longitudinally spaced annular grooves. This would permit split sleeve connectors attached to the hoops to be mounted about the posts. A lip on each split sleeve connector would then engage an annular groove in the post to hold the vertical position of the hoop. By this arrangement, the vertical positions of the hoops could be adjusted.

Therefore, the protection afforded my invention should only be limited in accordance with the scope of the following claims.

I claim:

1. An apparatus for supporting a plurality of containers comprising:
   a horizontal rectangular open frame base defined by a pair of parallel side beams connected together at the ends thereof by means of a pair of parallel end beams;
   a plurality of vertically extending support members secured to and extending upward at least from the ends of the side beams of the base and defined by a pair of spaced apart elongated legs connected at the lower end thereof to the base and connected together at top thereof by a cross member extending generally parallel to the end beams;
   holding means defined by encircling open frame means connected in horizontal rows between the legs of adjacent support members above and at each side of the base and encircling the outer wall of cylindrical containers and removably holding a plurality of cylindrical containers in vertically spaced rows extending horizontally parallel to the side beams of the base, and the holding means and, hence, the containers of each row being disposed above and at least partially within the dimensions of said base and inclined from their normal freestanding position away from the containers in an adjacent row, wherein the rows of holding means on opposite sides are offset vertically and the containers at least partially overlap at the center of the base.

2. An apparatus for supporting a plurality of containers comprising:
   a horizontal rectangular open frame base defined by a pair of parallel side beams connected together at the ends thereof by means of a pair of parallel end beams;
   a plurality of vertically extending support members secured to and extending upward at least from the ends of the side beams of the base and defined by a pair of spaced apart elongated legs connected at the lower end thereof to the base and connected together at the top thereof by a cross member extending generally parallel to the end beams; and
   holding means defined by encircling open frame means connected in horizontal rows between the support members above and at each side of the base and encircling the outer wall of cylindrical containers in vertically spaced rows extending horizontally parallel to the side beams of the base, wherein the rows of holding means on opposite sides are offset vertically and the containers at least partially overlap, wherein the containers are upwardly opening cylinders and the holding means includes a plurality of hoops, each hoop encircling a corresponding container, and the hoops and, hence, the containers of each row are disposed above and at least partially within the dimensions of said base and inclined between about thirty to forty-five degrees from their normal freestanding position away from the containers in an adjacent row.

3. An open frame storage rack for supporting a plurality of upwardly opening containers comprising:
   an open generally horizontal frame defined by a pair of generally parallel side beams connected together at the ends thereof by means of a pair of generally parallel end beams;
   a plurality of spaced apart elongated support members secured to and extending vertically from the side beams of the frame and connected together at the top thereof by means of an elongated cross member, wherein the support members define a plurality of horizontally spaced, inverted, generally U-shaped support members, the terminal ends of which are jointed to said side beams at opposite sides of the frame; and
   holding means defined by a plurality of circular hoops, each connected to and between adjacent pairs of the support members at diametrically opposite points of said circular hoops for encircling and removably holding a plurality of cylindrical open top containers in a plurality of vertically spaced horizontally extending rows on opposite sides of said frame, each container having an outer periphery, horizontally adjacent rows being positioned on opposite sides of and at least partially within the horizontal dimensions of the frame, and the hoops and, hence, the containers of each row being inclined outwardly and away from said rack from their normal freestanding positions so that their interiors are more readily accessible, wherein the containers each include a cylindrical body having a radial circumferential lip, and the holding means each having a diameter which encircles and engages the outer periphery of a corresponding container without permitting the lip of the container to pass therethrough.

4. An open frame storage rack for supporting a plurality of upwardly opening containers comprising:

an open generally horizontal frame defined by a pair of elongated generally parallel side beams connected together at the ends thereof by means of a pair of elongated generally parallel end beams;

a plurality of horizontally spaced, elongated support members secured to and extending vertically from the frame and connected together at the top thereof by means of an elongated cross member thereby defining inverted U-shaped support members; and holding means defined by a plurality of hoops, each connected to and between an adjacent pair of support members at diametrically opposite points of each said hoop and encircling and removably holding a plurality of cylindrical open top containers having a radial circumferential lip in a plurality of vertically spaced horizontally extending rows on opposite sides of said frame, horizontally adjacent rows being vertically offset and positioned on opposite sides of and at least partially within the horizontal dimensions of the frame so that the containers overlap, and the containers of each row being inclined outwardly from their normal freestanding positions so that their interiors are more readily accessible.

5. An apparatus according to claim 1 wherein the containers are upwardly opening cylinders and the holding means includes a plurality of hoops, each hoop positioned and oriented for encircling a corresponding container.

6. An apparatus according to claim 2 and further comprising casters attached to the base, at least two casters being mounted on the inside of one of the side beams for permitting the same to be rolled along the floor.

7. An apparatus according to claim 1 wherein the angle of inclination of the containers in the holding means is between about thirty to forty-five degrees.

8. A storage rack according to claim 1 wherein the containers each include a cylindrical body having a radial circumferential lip, and the holding means includes a plurality of hoops each having a diameter sufficient to encircle the body of a corresponding container without permitting the lip of the container to pass therethrough.

* * * * *